Patented May 22, 1934

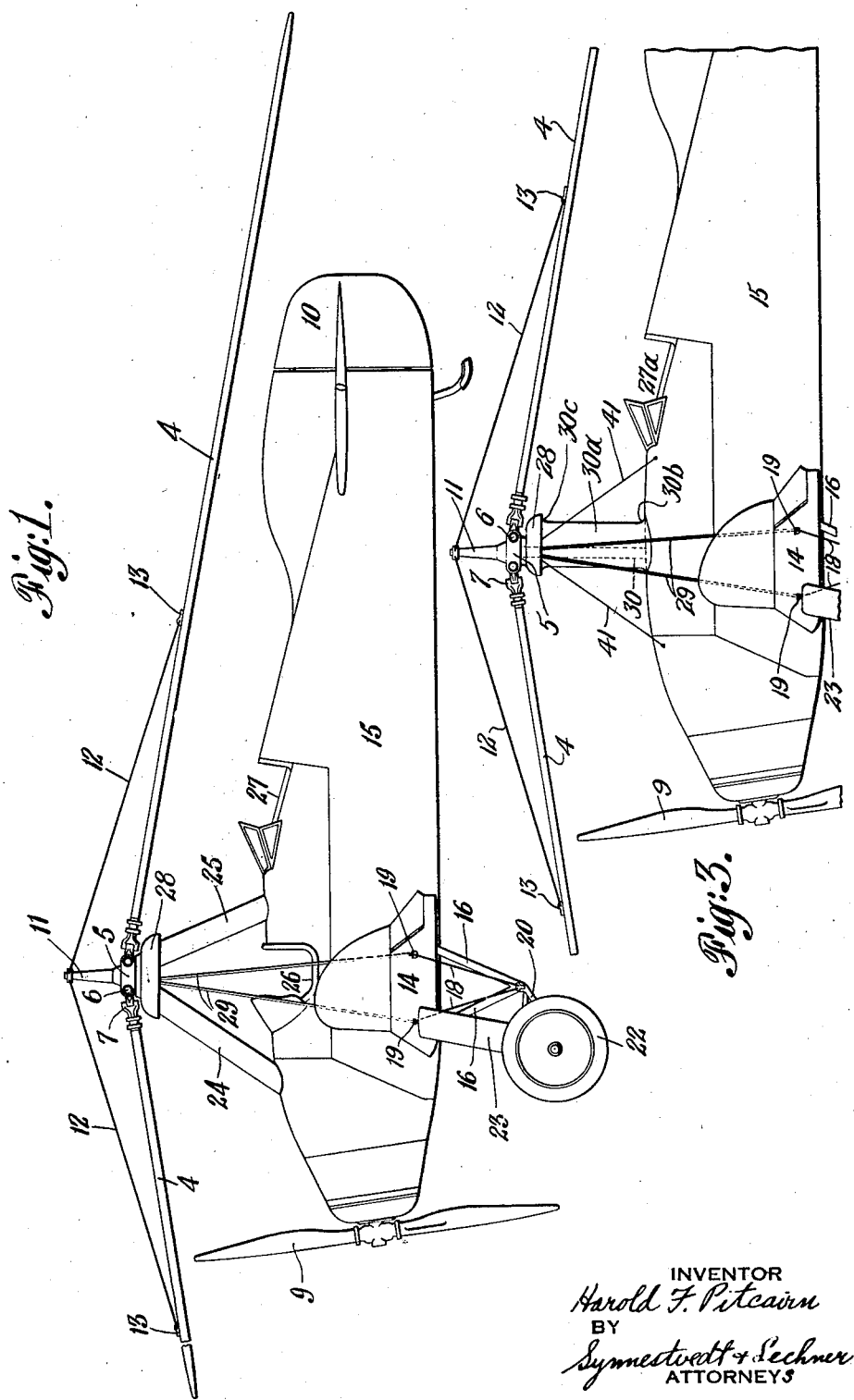

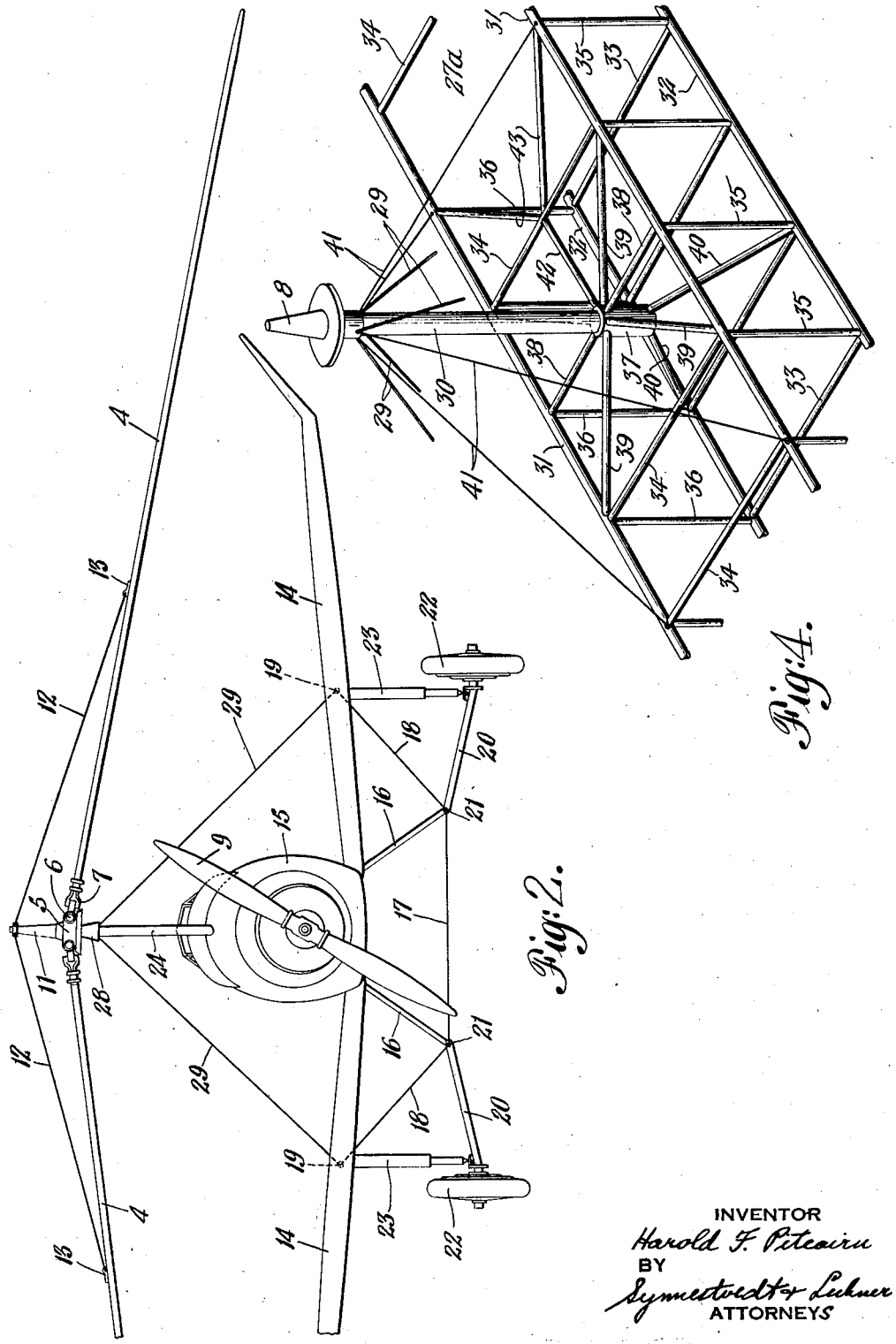

1,959,444

UNITED STATES PATENT OFFICE 1,959,444

AIRCRAFT HAVING ROTATABLE SUSTAINING MEANS

Harold F. Pitcairn, Bryn Athyn, Pa., assignor to Autogiro Company of America, Philadelphia, Pa., a corporation of Delaware Application November 20, 1930, Serial No. 496,871

8 Claims. (Cl. 244—19)

This invention relates to aircraft having rotatable sustaining means and is particularly concerned with the mounting or support of sustaining means of this character above the body or fuselage of the craft.

Among the more important objects of the invention are the increased aerodynamic, as well as structural efficiency, of apparatus of this character. Additionally, the present invention has in view improving vision from, as well as increasing accessibility of, one or more cockpits which may be provided in a fuselage.

Still further, attention is called to the fact that the structure of the present invention is designed for easy or ready attachment thereof to the body or fuselage of the craft.

Finally, as an object of the present invention, the structure is arranged in such manner as to permit the use of a highly desirable type of bracing not only of the mounting structure, but also of this structure in association with other parts of the craft, such, for example, as fixed wings and landing gear thereof.

As will appear more fully hereinafter, the foregoing objects and advantages are attained by the use of various structural and bracing members which provide sufficient strength and rigidity where such characteristics are most desirable, and which, at the same time, may be made of relatively light construction by virtue of the general arrangement thereof.

How the foregoing, together with other objects and advantages are obtained will be apparent from a consideration of the following description taken with the accompanying drawings, in which—

Fig. 1 is a side view of an aircraft of the general type hereinbefore referred to embodying the improvements of the present invention.

Fig. 2 is a front view of the craft of Fig. 1.

Fig. 3 is a view similar to Fig. 1 but illustrating a somewhat modified supporting structure; and Fig. 4 is a perspective fragmentary view of a portion of the fuselage framework of an aircraft equipped or provided with the supporting structure of Fig. 3.

Before considering the various figures in detail attention is called to the fact that this general type of aircraft usually includes a set of sustaining blades which are mounted above the body of the craft for rotation about a substantially vertically disposed axis.

In Figs. 1, 2 and 3 blades of this character are indicated by the reference numeral 4, the blades preferably being articulated or pivoted to a hub member 5 by means of joints such as indicated at 6 and 7. The hub member 5, of course, is mounted to revolve on a spindle or shaft (not shown in Figs. 1, 2 or 3, but similar to that indicated at 8 in Fig. 4). In order to support the blades when they are inactive and thus prevent fouling thereof on any other part of the craft, such, for example, as the propeller 9 or the tail structure 10, the hub device 5 carries an upwardly extending part 11 to which cables or wires 12 are secured, the cables being extended radially outwardly from the member 11 and secured to the blades 4 as indicated at 13.

Additionally, the craft is preferably provided with small substantially fixed wing elements 14 which may be arranged, for example, as indicated in Fig. 2, to extend laterally outwardly from the lower edge of the fuselage 15. Still further a landing gear or mechanism is preferably provided, the gear in this instance including compression members or struts 16 which are interbraced by means of a tension element such as the cable 17 (see Fig 2). Additional tension cables or wires 18 are arranged to interconnect the lower ends of the struts 16 and the fixed wing members 14, the points of attachment to the wing members preferably being disposed a substantial distance from the body of the craft as indicated at 19, with the said points preferably falling on the two main longitudinal spars of the fixed wings. The landing gear further includes wheel supporting members such as those indicated at 20, which are pivoted at 21 to the lower ends of the struts 16. At their ends the members 20, of course, carry suitable wheels 22 and shock absorbers 23 are positioned between the members 20 and the fixed wings 14 in such manner as to resist or cushion the landing thrust. At this point it should also be noted that preferably the lines of action of the shock absorbers are arranged to meet or intersect points of attachment of tension members 18 to the wings 14.

The landing gear itself is not my invention but is shown, described and claimed in the co-pending application of Agnew E. Larsen, Serial No. 528,280, filed April 7, 1931.

According to the present invention, as shown in Figs. 1 and 2, the mounting structure for the sustaining blade or wing system is of inverted V formation and includes a pair of compression members or legs 24, 25 which are preferably mounted on the fuselage of the craft, one forwardly and one rearwardly of a cockpit such as that indicated at 26 in Fig. 1. The craft of course, may also be provided with an addditional cockpit 27. In this instance it will be observed that the rear strut or leg 25 is mounted on the fuselage between the cockpits 26 and 27 and extends upwardly and forwardly therefrom toward a point positioned vertically above the forward cockpit 26. The forward strut 24 extends rearwardly and upwardly toward the same point above the said cockpit and the two struts are secured together within a suitable stream lined sheathing or housing 28. Additionally, attention is called to the fact that the two struts 24 and 25 are arranged in line, i. e., one behind the other lengthwise of the craft, so that the structure produces the least possible parasite drag, and, in addition, lends itself very readily to suitable stream lining. It will be understood, of course, that the spindle or shaft on which the hub 5 is mounted is secured to or carried by the upper end or apex of the angle formed between the members 24 and 25.

The present invention, furthermore, contemplates the provision of bracing means for the blade mounting structure and as shown in Figs. 1 and 2, this bracing means takes the form of tension wires or cables 29, 29. These bracing wires preferably are attached to the mounting structure at or at least in the region of the apex thereof, from which point they extend downwardly and laterally at each side of the fuselage 15 to the fixed wing members 14. According to the preferred arrangement these wires 29, 29 are attached to the fixed wings at or at least in the vicinity of the points indicated at 19 and hereinbefore referred to. In this way a bracing system for the blade mounting structure, fixed wings and landing gear is provided, the same including tension members which are angularly arranged around the fuselage or body of the craft.

This construction, therefore, not only provides a high degree of structural and aerodynamic efficiency, as well as other advantages hereinbefore referred to, but, in addition, provides increased bracing of the fixed wings and the landing gear. This results, of course, by virtue of the transmission of thrusts or stresses which may be imposed on the mounting structure, the wings 14 or the landing gear around or through the angular bracing system comprising the cables 29, 18 and 17. Attention is also called to the fact that upward thrusts through the shock absorbers are taken or resisted in a highly efficient manner by the bracing wires 18 and 17, the effect or resistance thereof being augmented by virtue of the cables 29 extending upwardly to the mounting structure from the points 19.

As a still further advantage, it should be noted that the centralization of the points of attachment of the cables 29 and 18 and the shock absorbers 23 to the fixed wings 14 results in a reduction of the number and complexity of fittings and the like which must be mounted in the fixed wing structures.

Referring now to Figs. 3 and 4, attention is first called to the fact that the blade mounting structure in this instance comprises a single substantially vertically disposed compression member or post 30 at the top of which the spindle 8 hereinbefore referred to is arranged. In Fig. 3, the post 30 is shown as being housed within a light stream-lined casing or sheating 30a which may be suitably faired into the fuselage, forwardly of the cockpit 27a, as at 30b. The upper end of the casing 30a may also be faired into the housing or apex member 28 as indicated at 30c. From comparison of Figs. 1 and 3 it will be observed that the structure of Fig. 3 is braced laterally to the fixed wings and landing gear, similarly to Fig. 1, by wires 29 and 18. In addition, the supporting mechanism of Figs. 3 and 4 is braced forwardly and rearwardly as by wires 41, thus giving very effective tension bracing angles laterally to the fixed wings and fore and aft to the fuselage.

Fig. 4 clearly shows the manner of attachment of the post 30 to the fuselage. This figure illustrates a plurality of longerons or beams 31 and 32 of a fuselage framework, the same being interconnected by means of substantially horizontally disposed bracing members 33 and 34, as well as substantially vertically disposed braces 35 and 36. In order to rigidly mount or support the post 30, the lower end thereof is preferably socketed in a member 37 and the member 37 is mounted in what might be termed a "stress distributing frame". In this instance, the frame referred to includes horizontally disposed members 38 extending between the socket 37 and the upper longerons 31. Diagonal braces 39 and 40 are also secured to the socket 37 from which they extend respectively, to the upper longerons 31, and the lower longerons 32. In each instance, furthermore, the diagonal braces 39 and 40 are preferably attached to the lower and upper longerons at or at least near the points of attachment thereto of cross braces 33 and 34. An additional bracing member 42 may be arranged rearwardly of the socket 37 and secured to a cross brace 34 and still further diagonal braces 43 may be arranged between the upper longerons 31 and the brace 34 just referred to. The cockpit 27a is disposed rearwardly of the diagonal members 43.

By the use of such a "distributing frame" various forces or stresses of suspension of the craft from the rotor or blade system, as well as similar, although opposite forces incident to the taking of the weight or load of the sustaining system by the craft during landing, are well distributed to a plurality of fuselage structural members. It will be seen, therefore, that with the single post 30 disposed intermediate the sides of the fuselage but in a "distributing frame" of the character referred to, forces such as those hereinbefore mentioned are well distributed to a plurality of the main beams or longerons.

The bracing or guy wires 41 are preferably attached to the post 30 at or in the vicinity of the top thereof, from which point these guy wires extend downwardly to the upper longerons 31. In the preferred arrangement the guys 41 are secured to the longerons 31 at the meeting or juncture of such longerons and their interbracing members 34, 35 and 36. With the bracing wires 41 attached to the fuselage in this manner, still further distribution of various forces, thrusts, and the like is provided for.

The modification of Figs. 3 and 4 is especially advantageous in reducing the total weight of blade mounting structures of this character to a minimum, and, additionally, provides the least possible head resistance so that the aerodynamic efficiency thereof attains a very high value.

In connection with both forms of the invention herein disclosed, attention is called to the fact that the supporting struts or legs of the mounting structure are arranged centrally of the body of the craft so that the various forces which are transmitted therethrough are readily and equally distributed in various directions through various bracing and beam members of the fuselage, and particularly to the two sides thereof. This distribution is provided by means of the "stress distributing frame" such as that shown in Fig. 4 and which, it will be understood, is similarly applied to each of the two legs of the mounting of Figs. 1 and 2.

In general, therefore, it will be seen that the present invention accomplishes the foregoing objects and attains the incident advantages by the use of a construction which is simple, rugged, readily attached or installed and highly efficient from the standpoint of aerodynamics, as well as structure.

In the foregoing description and the following claims, when I refer to compression members in the pylon structure, it will be understood, of course, that these members also take tension stresses, and primarily so when the craft is in flight.

I claim:—

1. In an aircraft of the rotative sustaining wing type, a mounting structure arranged to support the sustaining wings above the body of the craft, supplemental fixed lifting surfaces at the sides of the body of the craft, landing gear for the craft arranged to transmit landing shocks to the supplemental lifting surfaces at points, at each side of the craft, spaced outwardly from the body thereof, and tension bracing means extended between said supplemental lifting surfaces and an upper portion of said mounting structure, the last mentioned means being connected with the fixed lifting surfaces at points adjacent to those at which the landing shocks are imposed.

2. In an aircraft of the rotative sustaining wing type, a mounting structure arranged to support the sustaining wings above the body of the craft, supplemental fixed lifting surfaces at the sides of the body of the craft, landing gear for the craft arranged to transmit landing shocks to the supplemental lifting surfaces at points, at each side of the craft, spaced outwardly from the body thereof, and tension bracing means extended between said supplemental lifting surfaces and an upper portion of said mounting structure, and the fixed lifting surfaces further being braced by tension means extended downwardly and inwardly to a part fixed with respect to the body of the craft.

3. In an aircraft of the rotative sustaining wing type, a mounting structure arranged to support the sustaining wings above the body of the craft, supplemental fixed lifting surfaces at the sides of the body of the craft, landing gear for the craft arranged to transmit landing shocks to the supplemental lifting surfaces at points, at each side of the craft, spaced outwardly from the body thereof, and tension bracing means extended between said supplemental lifting surfaces and an upper portion of said mounting structure, the last mentioned means being connected with the fixed lifting surfaces at points adjacent to those at which the landing shocks are imposed, and the fixed lifting surfaces further being braced by tension means extended downwardly and inwardly to a part fixed with respect to the body of the craft.

4. In combination with the body of an aircraft, a sustaining rotor of the pivoted blade type, mounting means for the rotor including a compression structure extended upwardly to support the rotor above the body, supplemental fixed wings having compression means in their structure extended laterally from the body of the craft, landing mechanism for the craft including, at each side of the craft, a compression member extended generally outwardly from the body and another compression member extended downwardly from the fixed wings at points spaced outwardly from the body, and tension bracing elements extended from the fixed wings, at points adjacent the compression members associated therewith, to an upper portion of the rotor mounting structure.

5. In combination with the body of an aircraft, a sustaining rotor of the pivoted blade type, mounting means for the rotor including a compression structure extended upwardly to support the rotor above the body, supplemental fixed wings having compression means in their structure extended laterally from the body of the craft, landing mechanism for the craft including, at each side of the craft, a compression member extended generally outwardly from the body and another compression member extended downwardly from the fixed wings at points spaced outwardly from the body, tension bracing elements extended from the fixed wings, at points adjacent the compression members associated therewith, to an upper portion of the rotor mounting structure, and tension bracing elements extended downwardly and inwardly from the said points for connection with a fixed part of the craft adjacent to the compression members first mentioned.

6. An aircraft including a sustaining rotor of the pivoted blade type, means for mounting the rotor above the body of the craft including a compression structure of substantially inverted V-form, lying in a vertical and generally longitudinal plane with respect to the body of the craft, whereby fore and aft shocks and stresses arising in take-off, flight and landing are effectively distributed fore and aft of the craft, compression elements extended generally horizontally at opposite sides of the craft, landing mechanism arranged to transmit landing shocks upwardly against said elements, means bracing said elements from said body, and tension bracing means extended between said elements and an upper portion of said structure, whereby transverse shocks and stresses arising in take-off, flight and landing are effectively distributed transversely of the craft.

7. In an aircraft the combination of a body, propulsion means, a primary sustaining system of rotative wings mounted for normal actuation by relative flight wind and including an axis structure, a two-post mounting pylon for said system, formed as an inverted V and positioned with the plane of the V extending substantially vertically in the longitudinal mid-plane of the body, and tension braces extending from approximately the apex of the inverted V pylon to rigid structure of the craft for bracing said V laterally, the axis structure terminating adjacent said apex and above the body, and the forward leg of the V-pylon extending downwardly and well forwardly to a juncture with the body adjacent the propulsion means.

8. In an aircraft, a body, a sustaining rotor system including sustaining wing means of relatively great length as compared with the body and positioned for autorotation by relative airflow, a central hub or axis structure to which the wing means are pivotally or oscillatively secured, a forward propulsion engine for the craft located at the nose of the body, under the influence of which high forward speeds may be attained, whereby said rotor is aerodynamically turned and said wing means pivotally moved to accommodate variable forces, and a mechanism for mounting the rotor system above the body of the craft comprising in combination with said hub structure two compression tubes positioned as an inverted V which lies in the longitudinal vertical mid plane of the body, the hub or axis structure of the rotor being mounted at the apex formed by said V and terminating above the body proper, whereby said two compression tubes are adapted to connect the rotor axis structure to the body of the craft as the sole means of taking the compression loads when the rotor is not operating to sustain the craft, and the forward leg of the V being connected to the body adjacent the mounting of the engine in the nose to interbrace the engine and rotor, and the said two tubes being thus positioned to take also the lift loads of the rotor, the longitudinal bending stresses, and the major stresses set up by oscillations of the blades, when the rotor is operating to sustain the craft.

HAROLD F. PITCAIRN.